UNITED STATES PATENT OFFICE.

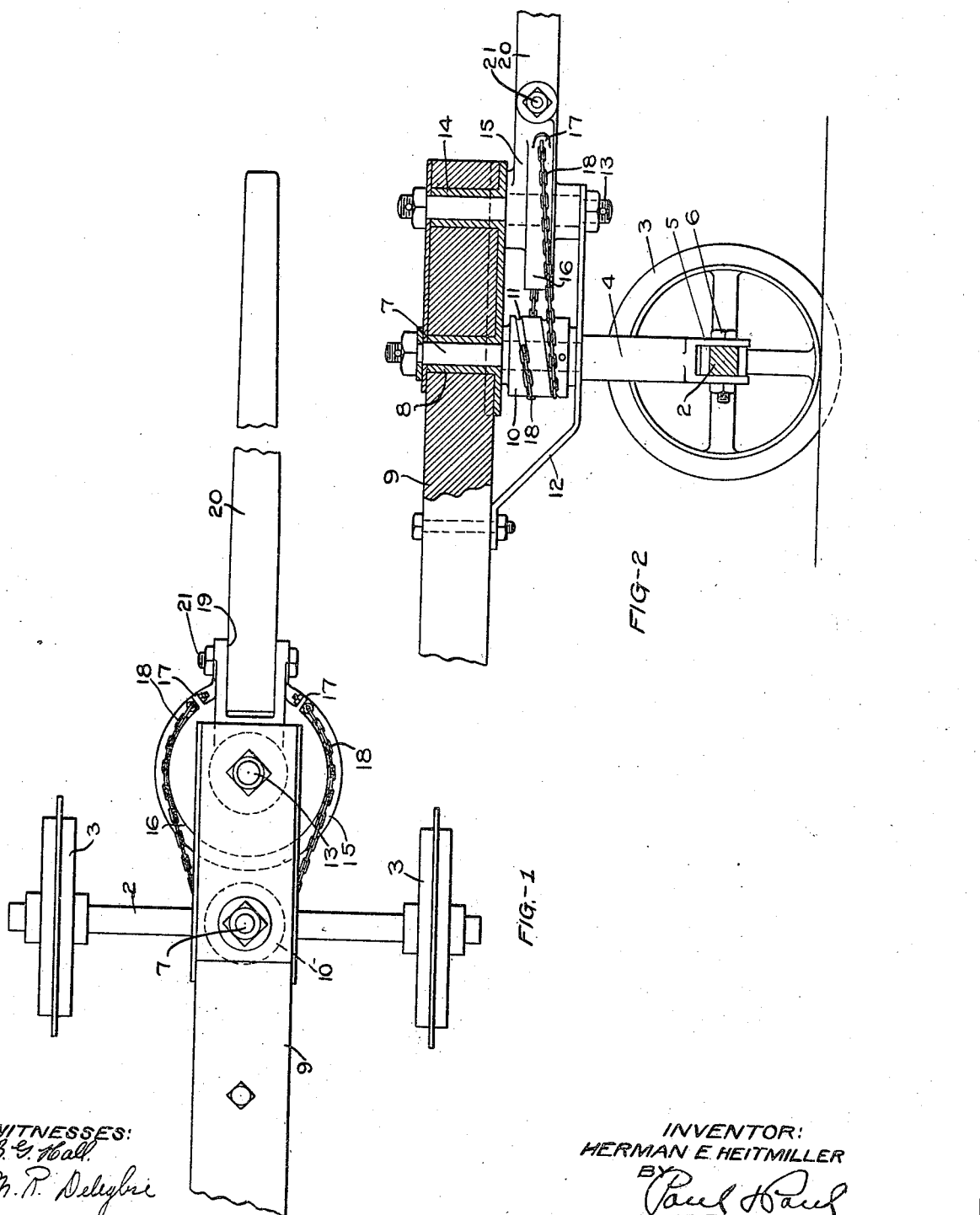

HERMAN E. HEITMILLER, OF STILLWATER, MINNESOTA, ASSIGNOR TO THE STATE OF MINNESOTA.

TONGUE-TRUCK.

1,258,772.  Specification of Letters Patent.  Patented Mar. 12, 1918.

Application filed October 27, 1917. Serial No. 198,791.

*To all whom it may concern:*

Be it known that I, HERMAN E. HEITMILLER, a citizen of the United States, resident of Stillwater, county of Washington, State of Minnesota, have invented certain new and useful Improvements in Tongue-Trucks, of which the following is a specification.

The object of my invention is to provide a truck wherein the lateral angular movement of the tongue effects a greater lateral or angular displacement of the wheels and thereby the turning of the binder connected therewith is facilitated.

A further object is to provide a tongue truck which will allow for the vertical oscillation of the axle and the up and down movement of the wheels in passing over rough or uneven ground.

A further object is to provide a truck of simple construction and one which will not tilt or become cramped in turning.

Other objects of the invention will appear from the following detailed description.

In the accompanying drawings forming part of this specification,

Figure 1 is a plan view of a tongue truck embodying my invention,

Fig. 2 is a sectional view, showing the manner of mounting the truck on the axle and the bearings of the stub tongue on the truck.

In the drawing, 2 represents the axle having suitable carrying wheels 3. 4 is an upright standard, having a forked lower end 5 pivoted at 6 on the axle. The upper end of this standard has a spindle 7 seated in a bearing 8 in the stub tongue 9 to which the binder is connected in the usual way. A hub 10 is mounted on the standard 4 beneath the tongue 9 and is provided with a spiral groove 11 in the surface thereof. This hub is securely fastened on the standard. 12 is a brace secured at one end to the underside of the stub tongue and projecting downwardly and forwardly therefrom and forming a guide and bearing for the standard 4 and also for the lower end of a bolt 13, the upper portion of which is seated within a bearing 14 in the forward end of the tongue 9. A casting 15 is mounted on the bolt 13 between the brace 12 and the underside of the tongue 9 and has a wheel 16 formed thereon provided with lugs 17 to which the ends of chains or other flexible connections 18 are attached. These chains are carried back to the hub 10 and fitted within the groove 11 and secured therein, so that when the wheel 16 is rocked back and forth in a horizontal plane, a strain will be alternately applied to the chain 18 to rock the spindle 4 on a vertical axis and oscillate the axle to change the angular position of the wheels with respect to the stub tongue. The casting 15 has a socket 19 therein in which a tongue 20 is secured by a bolt 21, said bolt forming a horizontal axis for the tongue 20, allowing it to be rocked up or down and permitting the wheels to drop into depressions or inequalities in the ground without undue strain or pull on the neck yoke. The hub 10 and the wheel 16 may be made in different sizes and in various ways the details of construction herein shown and described may be modified and still be within the scope of my invention.

I claim as my invention:

1. A tongue truck comprising an axle and wheels therefor, an upright standard mounted on said axle, a stub tongue having a bearing for the upper end of said standard, a hub secured on said standard, a wheel mounted on said stub tongue in advance of said hub, flexible means attached to said wheel on opposite sides thereof and wound on said hub and secured thereto, whereby oscillation of said wheel in a horizontal plane will rotate said hub to oscillate said axle, and a draft tongue mounted in said wheel.

2. A tongue truck comprising an axle and wheels therefor, a standard mounted on said axle, a stub tongue mounted on the upper end of said standard, a hub secured to said standard beneath said stub tongue and having a spiral groove therein, a wheel journaled on said stub tongue in front of and adjacent to said hub, chains attached to the periphery of said wheel and having their rear portions fitting within said groove and secured thereto, whereby the rocking of said wheel laterally will impart a rotating movement to said hub and axle, and a draft tongue mounted in said wheel.

3. A tongue truck comprising an axle and wheels therefor, a standard mounted on said axle, a stub tongue mounted on the upper end of said standard, a hub secured on said standard, a casting mounted on said stub tongue in advance of said hub and having curved peripheral surfaces, flexible means attached to said curved peripheral surfaces on opposite sides thereof and wound on said hub, and secured thereto, whereby lateral rocking movement of said casting will rotate said hub and standard, and a draft tongue mounted in said casting.

4. A tongue truck comprising an axle and wheels therefor, an upright standard mounted on said axle, a stub tongue having a bearing for the upper end of said standard, a draft tongue pivoted for horizontal oscillation in front of said standard, flexible means connected to said draft tongue on opposite sides of its pivot and to opposite sides of said standard, whereby horizontal movement of said draft tongue will rotate said standard on its vertical axis to oscillate said axle.

In witness whereof, I have hereunto set my hand this 19th day of October 1917.

HERMAN E. HEITMILLER.

Witnesses:
R. B. McPhetres,
W. G. Nelson.

Copies of this patent may be obtained for five cents each, by addressing the "Commissioner of Patents, Washington, D. C."